United States Patent
Ince et al.

(10) Patent No.: US 8,684,608 B2
(45) Date of Patent: Apr. 1, 2014

(54) ROLLING BEARING

(75) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/238,162

(22) Filed: Sep. 21, 2011

(65) Prior Publication Data

US 2012/0106886 A1 May 3, 2012

Related U.S. Application Data

(60) Provisional application No. 61/407,143, filed on Oct. 27, 2010.

(51) Int. Cl.
*F16C 19/52* (2006.01)
*F16C 25/08* (2006.01)

(52) U.S. Cl.
USPC ............ 384/493; 384/517; 384/557; 384/563

(58) Field of Classification Search
USPC ......... 384/209, 474, 492, 517, 557, 563, 565, 384/625, 569, 903, 493; 360/97.01, 99.08
See application file for complete search history.

(56) References Cited

U.S. PATENT DOCUMENTS

| | | | | |
|---|---|---|---|---|
| 1,968,840 | A * | 8/1934 | Linn | 409/159 |
| 2,646,321 | A * | 7/1953 | Geist | 384/474 |
| 4,257,655 | A * | 3/1981 | Mirring | 384/569 |
| 4,336,971 | A * | 6/1982 | Reiter | 384/484 |
| 5,028,152 | A | 7/1991 | Hill et al. | |
| 6,364,957 | B1 * | 4/2002 | Schneider et al. | 118/728 |
| 6,628,477 | B1 * | 9/2003 | Oelsch | 360/99.08 |
| 2009/0080824 | A1 * | 3/2009 | Joki et al. | 384/557 |

FOREIGN PATENT DOCUMENTS

| | | | | |
|---|---|---|---|---|
| DE | 2263323 A * | 6/1974 | | F16J 1/64 |
| DE | 19908316 A1 * | 8/2000 | | F16H 48/08 |
| DE | 102007045655 A1 * | 4/2009 | | F16C 19/52 |
| DE | 102009005888 A1 * | 7/2010 | | F16C 19/52 |
| EP | 631081 A1 * | 12/1994 | | F16L 19/07 |
| JP | 10132162 A * | 5/1998 | | F16C 35/04 |
| JP | 11260381 A * | 9/1999 | | H01M 6/16 |
| JP | 2007100792 A * | 4/2007 | | F16C 25/08 |
| JP | 2010121651 A * | 6/2010 | | F16C 35/073 |

* cited by examiner

*Primary Examiner* — Marcus Charles
(74) *Attorney, Agent, or Firm* — Lucas & Mercanti, LLP

(57) ABSTRACT

A rolling bearing, which has at least one bearing ring and at least one lash compensation element possessing temperature-dependent extendibility arranged on the bearing ring. The rolling bearing has ring profile, which at least partially surrounds the lash compensation clement. The ring profile has at least one hollow cylindrical section oriented axially parallel to an axis of rotation of the rolling bearing and at least one radially oriented disk section. Also, at least one slit is formed in the ring profile.

5 Claims, 3 Drawing Sheets

ROLLING BEARING

CROSS-REFERENCE TO RELATED APPLICATION

This application claims the priority of U.S. 61/407,143 filed on Oct. 27, 2010, which is incorporated herein by reference.

FIELD OF THE INVENTION

The invention is directed to a rolling bearing comprising at least one lash compensation element.

BACKGROUND OF THE INVENTION

Among rolling bearings, radial rolling bearings, thrust rolling bearings and angular contact rolling bearings are used for the mounting of shafts and other rotatable machine components, particularly in vehicle transmissions. The generic rolling bearings comprise at least one row or a plurality of rows of rolling elements that are supported on rolling contact raceways. The rolling elements are balls and rollers. Rollers of smaller diameter with a certain length are also called needle rollers. At least one of the rolling contact raceways is configured on a bearing ring that can have a one-piece or a multi-piece structure. In particular, in the case of mounting through thrust bearings or angular contact rolling bearings, a lash-free biasing of these rolling bearings is a necessary pre-requisite for their flawless functioning. In angular contact rolling bearing arrangements, for example, two of the angular contact rolling bearings are biased free of lash against each other.

In angular contact rolling bearing arrangements, lash-free biasing means that the angular contact rolling bearings are biased both in radial and in axial direction and that at least movement lashes between the rolling elements and the bearing rings within the angular contact bearings are eliminated. Angular contact bearings are taper roller bearings or angular contact roller bearings or angular contact ball bearings.

The invention relates to all types of rolling bearings for rolling bearing arrangements with which the shafts can be mounted in housings made of materials having higher thermal expansion coefficients than the mounting elements and the mounted elements. The mounting elements are rolling bearings such as radial bearings, thrust bearings and preferably angular contact bearings. The mounted elements are the shafts, gearwheels, differential cages or planet carriers mounted through the rolling bearing arrangement. As a rule, the housings are made out of light metals and their alloys. The mounting and the mounted elements are made as a rule out of steel.

As known, light metals have a higher thermal expansion coefficient than steel. Due to the differences in the thermal expansion coefficients, the housing made of light metal expands more than the mounting and the mounted elements when the temperature rises. As a result, the pre-stresses in the rolling bearing arrangements can be lowered or even nullified. The reduction of pre-stresses results in axial excursion of the biased bearing rings to the point of producing lashes in the bearings with a complete absence of pre-stresses. In addition, this phenomenon known in the technical field is intensified by the fact that the bores of the mounting seats in housings made of the materials possessing the higher thermal expansion coefficients widen radially more than the respective bearing ring arranged in the bore, so that the scats of the rolling bearings in the bores can loosen to the extent of giving rise to radial lashes.

As also described in U.S. Pat. No. 5,028,152 A, thermo compensation elements, also called TCE are used in rolling bearing arrangements. These TCE's are made of a material whose thermal expansion coefficient, as a rule, is much higher than that of the material of the housing. The TCE's are seated on the outer periphery of the respective axially displaceable bearing ring and protrude in axial direction beyond the axially directed front end of the outer ring while being biased against an axial housing-mounted stop. Upon a rise of temperature in the surroundings of the rolling bearing arrangement, the TCE's, due to their higher thermal expansion coefficients, expand more than the housing, so that the axially protruding portion of the TCE's lengthens in axial direction and the pre-stress in the rolling bearing arrangement is maintained. Because, compared to steel and also to light metals, the TCE's are made of a relatively soft material, they are encapsulated at least partially by a U-shaped ring profile. The ring profile is given the shape of the TCE's, and retains them in position while protecting them through axial stops in the contact zone particularly in contact with the housing.

The housing described in U.S. Pat. No. 5,028,152 A is a ring profile that, in longitudinal section, is configured longitudinally along the central axis of the ring profile or U-shaped along the central axis of the respective angular contact bearing. Viewed in any longitudinal section, the two legs of the U-profile are radially parallel to each other and are oriented in axial direction axially parallel to the central axis. The web that connects the legs is oriented in radial direction and thus crosswise to the central axis. The TCE is supported axially on the housing through the web. U.S. Pat. No. 5,028,152 A describes an arrangement in which the TCE is entirely encapsulated by two U-shaped profiles. Arrangements of this kind necessitate very exact execution of the TCE and of the profiles because otherwise, due to the large manufacturing tolerances, their thermal expansion behavior cannot be reproduced repeatedly with identical values. Very exact manufacturing is very expensive. After repeated use, air inclusions can be formed in the entirety completely encapsulated TCE, so that it is not possible to estimate its expansion characteristic over a long period of time.

In the rolling bearing arrangement described in U.S. Pat. No. 5,028,152 A, the bearing ring on which the TCE is seated comprises a depression for this seat which forms an inner edge. By inner edge is to be understood a region on which two surfaces converge and form an inner corner. The surfaces in the present case are a circular ring surface and an outer cylindrical surface. The depression must possess axial and radial dimensions that correspond substantially to the dimensions of the ICE, while the TCE must protrude axially beyond the front end of the bearing ring.

SUMMARY OF THE INVENTION

The invention broadly relates to a rolling bearing comprising at least one lash compensation element (TCE) possessing temperature-dependent extensibility arranged on one bearing ring of the rolling bearing. The lash compensation element is surrounded at least partially by an angular ring profile. In the simplest form, the angular ring profile comprises in any longitudinal section viewed along the axis of rotation of the rolling bearing, two legs that are at a right angle to each other. One of the legs describes a hollow cylinder extending concentrically to the axis of rotation, and in a longitudinal section, said leg is oriented in axial direction axially parallel to the axis of rotation. The other of the two legs as viewed in a longitudinal section, is directed vertically, that is to say radially to the axis of rotation and describes an annular disk extending concentrically to the axis of rotation of the rolling bearing. Both legs, i.e., the annular disk and the hollow cylinder of the ring profile are preferably made as a single solid piece however, according to the invention, one of the legs or both legs comprise at least one slit. Alternatively, one slit or a plurality of slits are configured between the legs. The ring profile can also be made up of individual segments that are separated from one another on the periphery and/or radially and/or axially by slits. Alternatively sections of the ring profile are interrupted by slits without the peripheral or radial or axial coherence of the ring profile being undone altogether.

The lash compensation element is connected through a fusion of materials by gluing (also vulcanizing) or welding to the bearing ring, or is loosely inserted into the ring profile between the bearing ring and the ring profile. The cooperation of the TCE with the ring profile functions substantially due to the fact that the TCE can expand freely in axial direction and in doing so, pushes the ring profile in axial direction beyond the front end of the bearing ring. Additionally, the split allows the TCE to expand radially.

The invention likewise concerns a rolling bearing in the form of a pre-assembled unit which is pre-assembled with the lash compensation element and the ring profile. For this purpose, the lash compensation element is connected either by fusion of materials or by positive engagement to the bearing ring. The ring profile is connected either by fusion of materials or by positive engagement to the TCE. Connections made by fusion of materials are required particularly when the ring profile is composed of individual segments completely separated from each other by slits. In this case, the individual segments for forming the ring profile are fixed through fusion of materials by gluing. Alternatively, the plastic material of the thermo compensation element is sprayed onto the segments or the ring profile.

Alternatively, the invention also concerns radial bearings and thrust or angular contact bearings of the types: ball bearings, cylinder roller bearings or taper roller bearings.

The advantage of the invention resides particularly in the fact that such an arrangement does not require more radial design space than a prior art arrangement and can thus be used in existing constructions, for example in power take-off gears of automotive vehicles. Manufacturing tolerances are reduced compared to prior art arrangements in which TCE's are used. The expansion behavior of the TCE's comprising a ring profile is stably repeatable and comparable even in case of large manufacturing batches, for all parts of the manufacturing batches.

BRIEF DESCRIPTION OF THE DRAWINGS

The invention will now described more closely with reference to examples of embodiment.

DETAILED DESCRIPTION OF THE INVENTION

Figure 2:
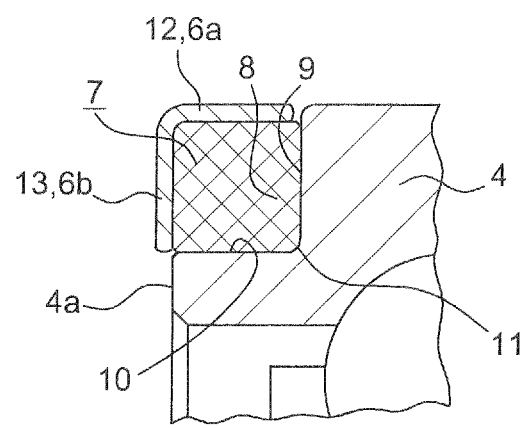
FIGS. 2, 3, 4, 5 and 6 show the detail Z of FIG. 1 in enlarged illustrations.
Figure 3:
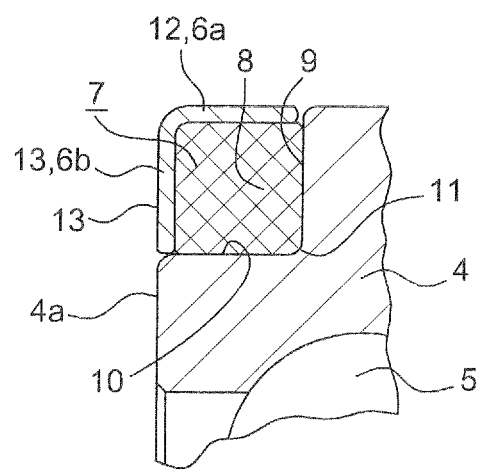
Figure 4:
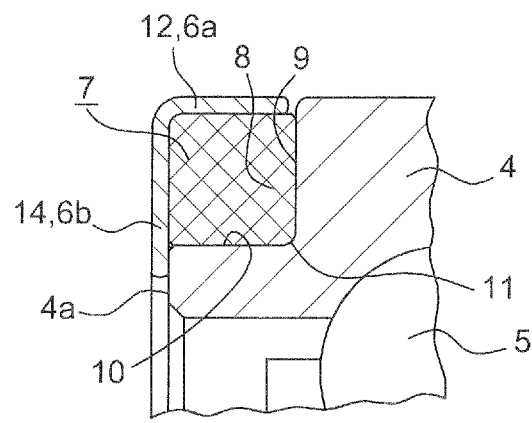
Figure 5:
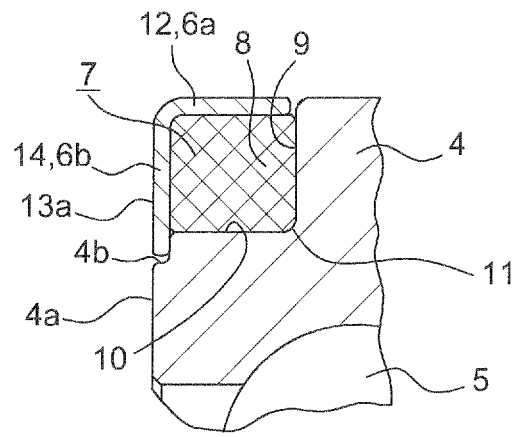
Figure 6:
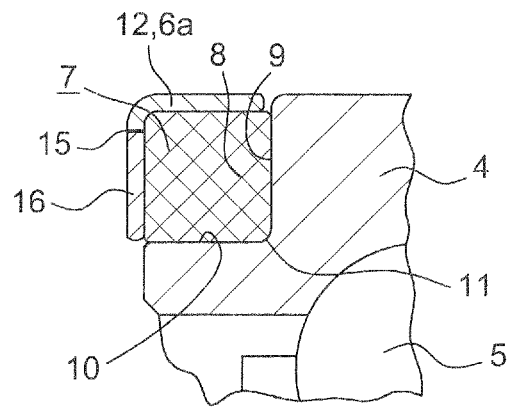

The angular contact ball bearing I, also called a tandem ball bearing (TBB), has an axis of rotation 2, an inner bearing ring 3 and an outer bearing ring 4 as also two rows of rolling elements 5 in form of balls. Further, a TCE 7 partially bordered by a ring profile 6 is seated on the outer bearing ring 4. For providing a seat for the TCE 7, the outer bearing ring 4 comprises a depression 8 which forms an inner edge. By inner edge is to be understood the region on which a circular ring surface 9 and an outer cylindrical surface 10 converge and form an inner corner 11. The depression comprises axial dimensions A and radial dimensions R which correspond substantially to the dimensions of the TCE 7 which is bordered by the ring profile 6. On the front end, the TCE 7 must protrude axially beyond the end surface 4a of the bearing ring 4 as represented in FIGS. 2, 4 and 6. Alternatively, in the cold state, the TCE 7 may also be axially flush with the end surface 4a as represented in FIGS. 3 and 5. However, in the warm state, the TCE 7 will protrude axially beyond the end surface 4a.

In the illustrations of FIGS. 2 and 3, the ring profile 6 comprises an axially directed leg 12 which, in the sectional view, images a hollow cylindrical section 6a. The hollow cylindrical section 6a is connected to a radially directed annular disk-shaped section 6b which, in the sectional view, is imaged by the leg 13. In the illustration of FIG. 2, the TCE 7 which is bordered by the ring profile 6 protrudes axially beyond the end surface 4a by a measure that corresponds to the sheet thickness of the leg 13 of the ring profile 6 made of sheet metal. In the illustration of FIG. 3, the end surface 13a and the end surface 4a are situated in a common radial plane.

In the illustrations of FIGS. 4 and 5, the ring profile 6 comprises an axially directed leg 12 which, in the sectional view, images a hollow cylindrical section 6a. The hollow cylindrical section 6a is connected to a radially directed annular disk-shaped section 6b which, in the sectional view, is imaged by the leg 14. In the illustration of FIG. 4, the TCE 7 which is bordered by the ring profile 6 protrudes axially beyond the end surface 4a by a measure that corresponds to the sheet thickness of the leg 14 of the ring profile 6 made of sheet metal. In the illustration of FIG. 5, the end surface 13a and the end surface 4a are situated in a common radial plane. In both cases, the leg 14 forms an axial stop for the ring profile 6 on the bearing ring 4. In the illustration of FIG. 4, the leg 14 abuts in the cold state of the TCE axially against the end surface 4a. In the illustration of FIG. 5, the leg 14 bears in the cold state in an axial, stepped depression 4b axially against the bearing ring 4.

Figure 1:
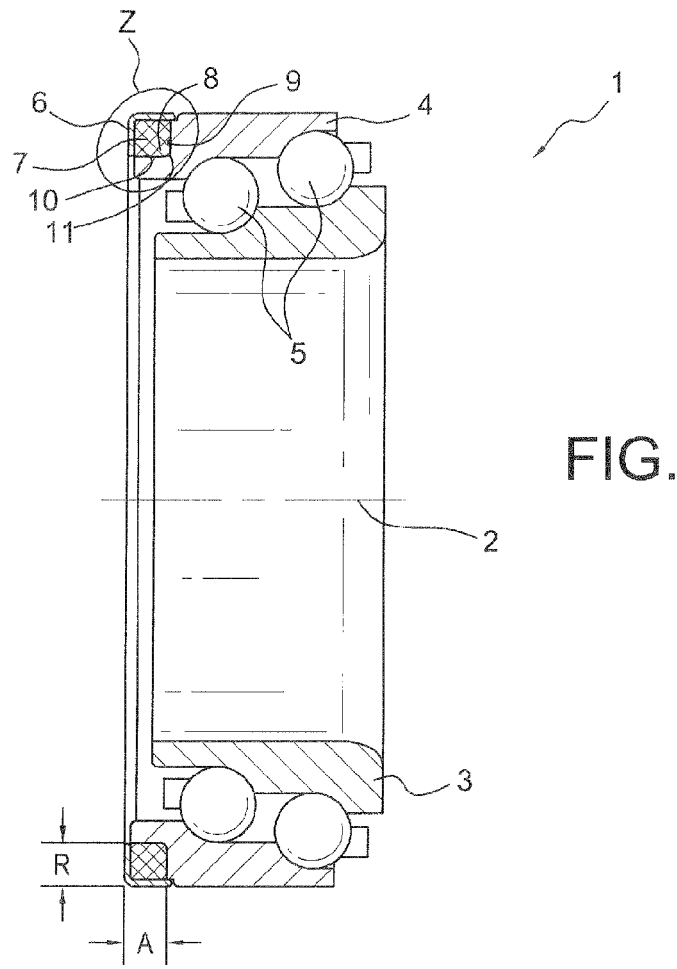
FIG. 1 shows a longitudinal section taken along the axis of rotation of the rolling bearing which, by way of example, is configured as an angular contact ball bearing.
Figure 1A:
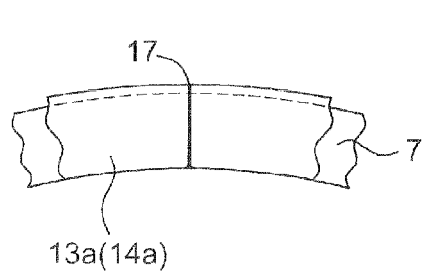
FIGS. 1a and 1b show a front view of the radial slit.
Figure 1B:
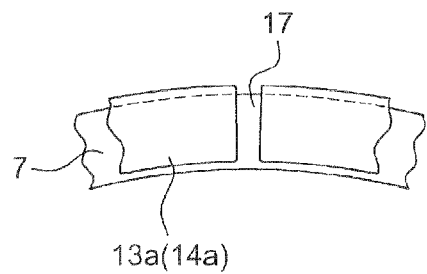

Each of FIGS. 1a and 1b shows a detail of the rolling bearing 1 in the front view. In the front view, a section of the ring profile 6 is illustrated in a front view on the respective end surface 13a or 14a of the legs 13 and 14, which section is interrupted on the periphery by a slit 17. FIG. 1a shows the slit as it appears in the initial position when the TCE arranged behind it is cold. FIG. 1b shows the widened slit 17 in a state in which the TCE 7 is warmed up and has expanded.

FIG. 6 shows an arrangement of the rolling bearing 1 in which the TCE 7 is partially bordered by a ring profile 6 that comprises an axially directed leg 12 which, in the sectional view images a hollow cylindrical section 6a. The hollow cylindrical section 6a is either completely separated radially from a radially directed annular disk-shaped section 6a by an annular slit 15. Alternatively, the slit 15 is oriented in form of a circular arc or in any other manner and interrupts the connection between the leg 12 and the leg 16 by which, in the sectional view, the annular disk-shaped section 6a is imaged, on only one section radially without completely undoing the connection between the legs 12 and 16. Alternatively, the slit 15 is adjoined along the periphery by at least one or by a plurality of further slits 15 without the connection between the legs 12 and 16 being completely undone.

The invention claimed is:

1. A rolling bearing, comprising:

at least one bearing ring having an inner corner formed by a circular ring surface and an outer cylindrical surface;

at least one lash compensation element possessing temperature-dependent extendibility arranged on the at least one bearing ring of the rolling bearing in the inner corner;

a ring profile, which at least partially surrounds the lash compensation element, having at least one hollow cylindrical section oriented axially parallel to an axis of rotation of the rolling bearing, and at least one radially oriented disk section; and at least one slit formed in the ring profile, wherein the ring profile allows the at least one lash compensation element to expand both axially radially.

2. The rolling bearing according to claim 1, wherein the at least one slit is formed in the hollow cylindrical section.

3. The rolling bearing according to claim 1, wherein the at least one slit is formed in the disk section.

4. The rolling bearing according to claim 1, wherein the at least one slit is disposed between the disk section and the hollow cylindrical section.

5. The rolling bearing according to claim 1, wherein the lash compensation element is a thermo compensation element made at least of one material which possesses a thermal expansion coefficient that is different from thermal expansion coefficients of materials made of light metal alloys or of steel.

* * * * *